(12) United States Patent
Barnett

(10) Patent No.: US 7,726,021 B2
(45) Date of Patent: Jun. 1, 2010

(54) LABYRINTH SEAL REPAIR

(75) Inventor: Barry Barnett, Markham (CA)

(73) Assignee: Pratt & Whitney Canada Corp., Longueuil (CA)

(*) Notice: Subject to any disclaimer, the term of this patent is extended or adjusted under 35 U.S.C. 154(b) by 839 days.

(21) Appl. No.: 11/528,648

(22) Filed: Sep. 28, 2006

(65) Prior Publication Data

US 2008/0080971 A1    Apr. 3, 2008

(51) Int. Cl.
B23P 6/00    (2006.01)
F01D 11/02    (2006.01)

(52) U.S. Cl. .............. 29/889.1; 29/402.02; 29/402.08; 415/174.5; 277/412

(58) Field of Classification Search ............ 29/889.1, 29/889.21, 889.22, 402.02, 402.08, 525, 29/402.03; 415/173.3, 173.5, 174.5, 173.1, 415/170.1, 115, 174.2; 277/355, 412, 419, 277/421

See application file for complete search history.

(56) References Cited

U.S. PATENT DOCUMENTS

| | | | |
|---|---|---|---|
| 3,846,899 A * | 11/1974 | Gross | ............... 29/402.02 |
| 4,320,903 A | 3/1982 | Ayache et al. | |
| 4,449,714 A | 5/1984 | Meier | |
| 4,606,102 A | 8/1986 | Riethmuller | |
| 4,657,171 A | 4/1987 | Robins | |
| 5,211,535 A | 5/1993 | Martin et al. | |
| 5,222,742 A * | 6/1993 | Roberts | ............... 277/420 |
| 5,345,484 A * | 9/1994 | Deaver et al. | ............... 376/407 |
| 5,501,573 A * | 3/1996 | Sanders | ............... 415/173.5 |
| 5,630,590 A | 5/1997 | Bouchard et al. | |
| 5,971,703 A | 10/1999 | Bouchard | |
| 6,030,175 A | 2/2000 | Bagepalli et al. | |
| 6,200,689 B1 | 3/2001 | Ferrigno et al. | |
| 6,422,815 B1 * | 7/2002 | Marler et al. | ............ 415/173.3 |
| 6,654,437 B2 | 11/2003 | Mazuy | |
| 7,025,356 B1 | 4/2006 | Cheung et al. | |
| 7,430,802 B2 * | 10/2008 | Tiemann | ............... 29/889.22 |
| 2004/0000761 A1 | 1/2004 | Addis | |
| 2005/0169749 A1 | 8/2005 | Coulon et al. | |

FOREIGN PATENT DOCUMENTS

WO    WO 2005/028812    3/2005

* cited by examiner

Primary Examiner—David P Bryant
Assistant Examiner—Ryan J Walters
(74) Attorney, Agent, or Firm—Ogilvy Renault LLP

(57) ABSTRACT

A method for repairing damaged fins in a labyrinth seal without the use of welding or metallurgical bonding by removing a section of the shaft containing the damaged fins, and providing a sleeve with replacement fins.

6 Claims, 3 Drawing Sheets

LABYRINTH SEAL REPAIR

TECHNICAL FIELD

The invention relates to repair of a labyrinth seal and a replacement component for use therein.

BACKGROUND OF THE ART

The invention relates to repair of a labyrinth seal, particularly in a fan rotor in gas turbine engines wherein the seal is formed on a shaft that rotates in relation to another moving or stationary runner surface.

The air seal comprises the fan rotor with labyrinth seal fins, which rotates, and a concentric shaft known as the seal runner which is stationary. Frequently, a bearing contained in a bearing compartment supports the motion of the two shafts. The bearing compartment contains oil lubricant which must be contained within the compartment. The oil must be confined to the bearing chamber by using a seal. In this instance the oil is retained in the bearing chamber by using an air pressurized labyrinth seal.

A labyrinth seal is useful in sealing an air-oil interface in gas turbine engines. If the seal fins are damaged or incorrectly manufactured, however, the sealing of the bearing compartment may be jeopardized and result in oil leakage. If the oil leakage is excessive, the fan rotor will have to be replaced and scrapped. This is expensive and wasteful. Alternatively, the seal may be repaired by removing and replacing only the damaged fins. Challenges in repairing the damaged fins include the limited line of sight access of the fins within the fan rotor, the structural integrity of the fan rotor and the precision of the labyrinth seal dimensions.

Existing repair methods use weld repair build-up and subsequent re-machining of the fins to the required dimensions, however this approach presents several drawbacks. Accordingly, there is room for improvement.

SUMMARY OF THE INVENTION

One aspect of the present invention is a method for replacing a fin in a labyrinth seal, the fin having a radially outward runner contact surface and a radially inward base extending from a shaft, the method comprising the steps of: removing a section of the labyrinth seal containing the fin, thus forming a recess in a radially outward surface of the shaft; providing a sleeve with a radially inward surface and a replacement fin; and fitting the radially inward surface of the sleeve into the recess in the radially outward surface of the shaft, the sleeve being attached to the shaft by way of an interference fit with the shaft.

Another aspect of the present invention is a sleeve for replacing at least one damaged fin of a labyrinth seal, the damaged fin being on a section removed from the labyrinth seal, thus forming a recess, the sleeve comprising at least one replacement fin, wherein the sleeve fits into the recess and is attached by way of an interference fit.

Another aspect of the present invention is a turbine engine having a labyrinth seal, the labyrinth seal having a plurality of fins, wherein the labyrinth seal comprises a sleeve attached by way of an interference fit, and at least one of the plurality of fins is formed on the sleeve.

Features that distinguish the present invention from the background art will be apparent from review of the disclosure, drawings and description of the invention presented herein.

BRIEF DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
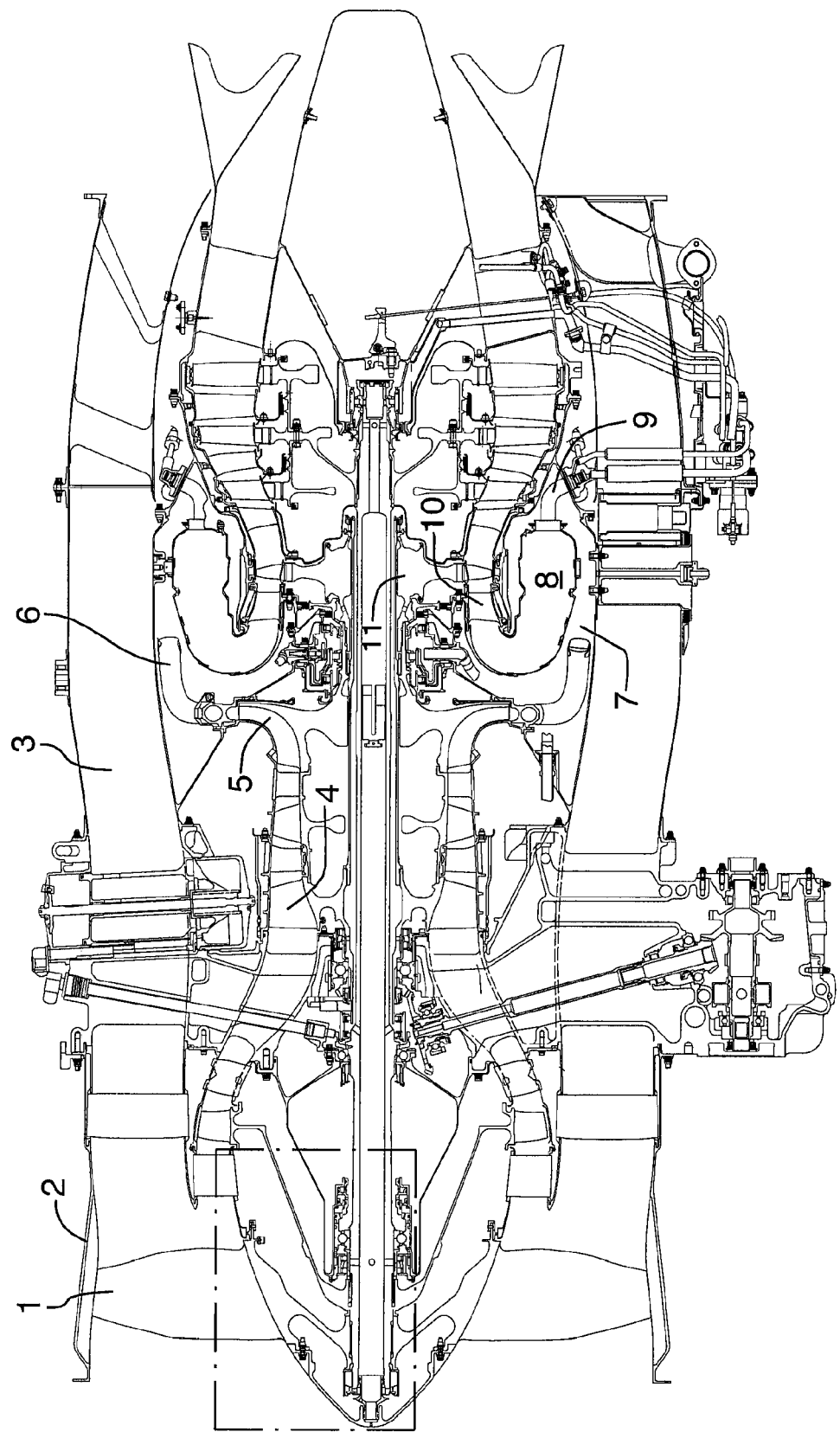
FIG. 1 shows an axial cross-section through a prior art turbo-fan gas turbine engine.

FIG. 1 shows an axial cross-section through a turbo-fan gas turbine engine. It will be understood however that the invention is equally applicable to any type of engine with a combustor and turbine section such as a turbo-shaft, a turbo-prop, or auxiliary power units. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
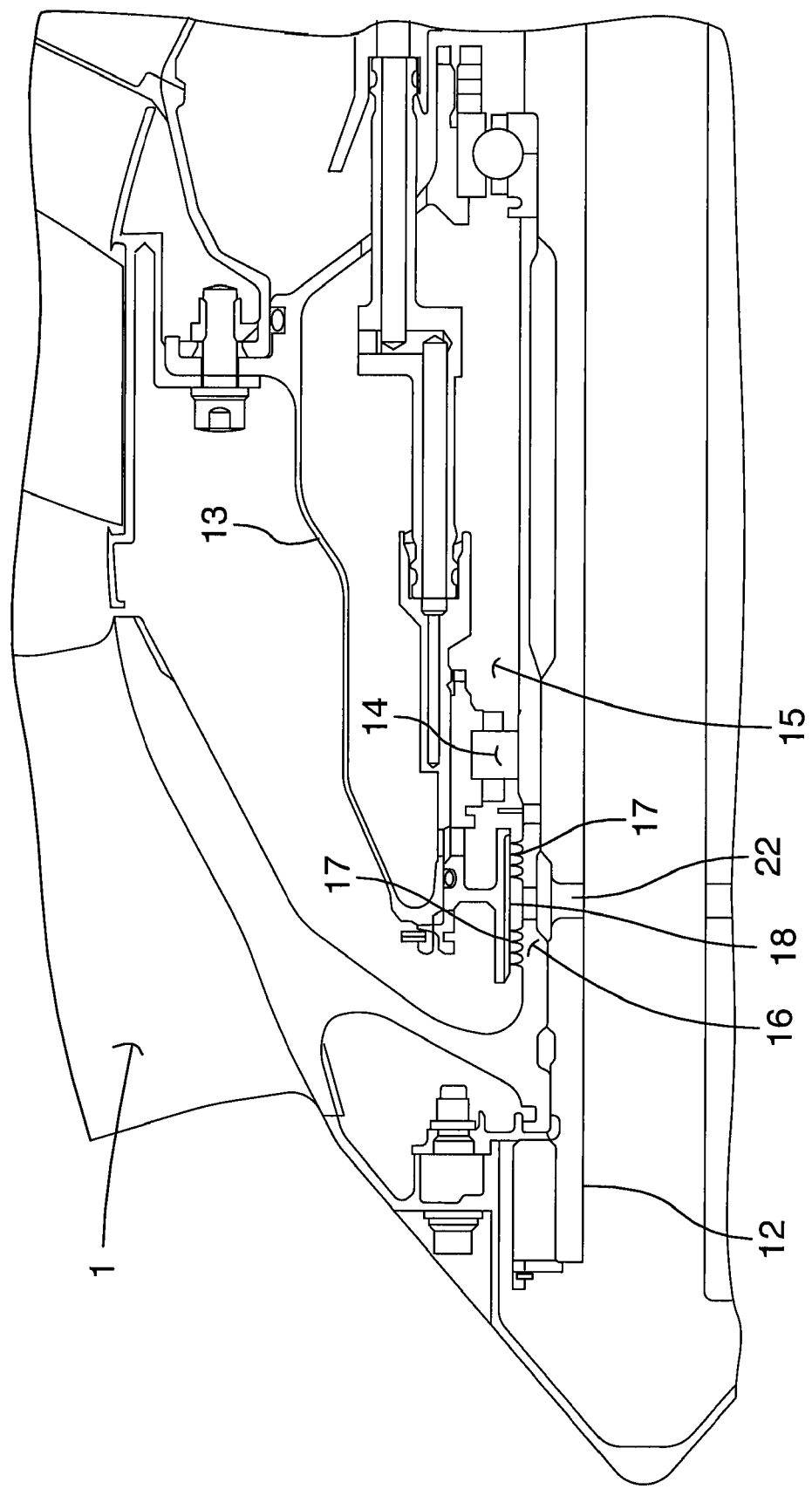
FIG. 2 is partial cross-section showing a top half section of a prior art fan rotor shown in FIG. 1 in dashed outline, with a labyrinth seal and bearings rotatably supporting the central shaft and rotor components.

FIG. 2 shows partial broken-away axial cross-section through the area bounded by dashed lines in FIG. 1 surrounding a labyrinth seal of a prior art turbo-fan gas turbine engine. It will be understood however that the invention is equally applicable to repair damaged fins of a labyrinth seal in any type of turbine, such as a steam turbine, or any rotary engine requiring repair to labyrinth seals.

A fan rotor in the gas turbine engine comprises the rotating parts assembled together including an inner shaft 12 and a plurality of fan blades 1 mounted for rotation relative to a supporting concentric outer stationary shell 13. Bearings 14 in an enclosed bearing compartment 15 support the rotation of the inner shaft 12 relative to the shell 13. Integral with the inner shaft 12 is a labyrinth seal 16, with a plurality of rotating fins 17 in close proximity to a stationary seal runner 18 on the bearing compartment 15. When the fan rotor is in operation, air under pressure from the inside of the shaft 12 flows through radial holes 22 in the hollow shaft 12 and flows through the radial running gap in the air seal between the tips of the fins 17 and the runner 18 thus preventing the oil from escaping.

Figure 3:
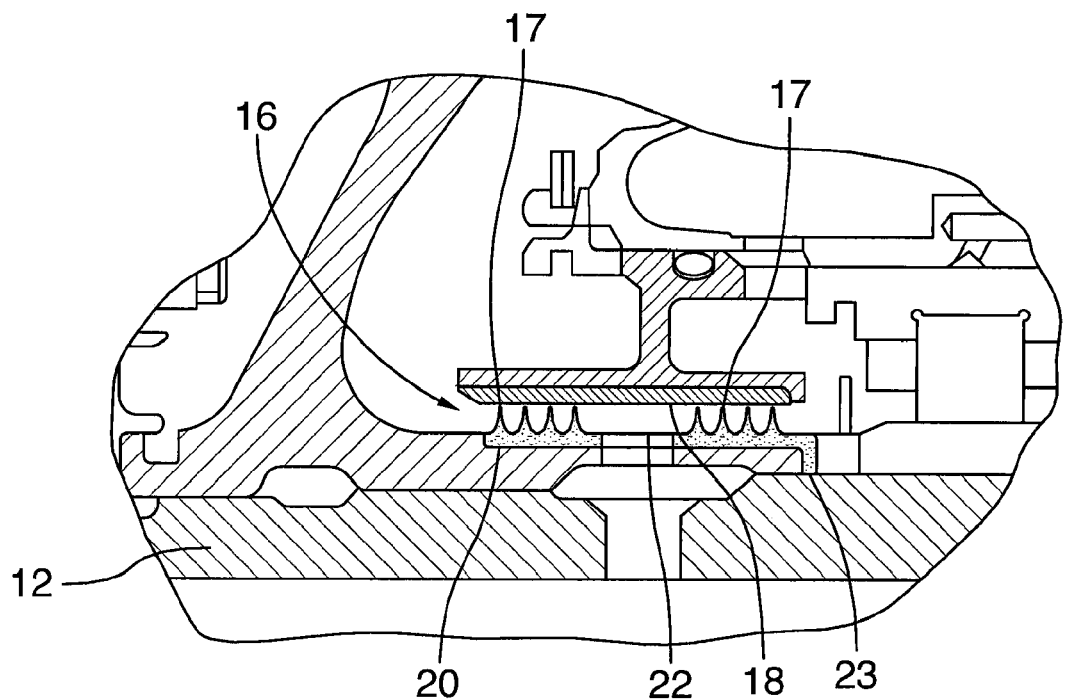
FIG. 3 is a detail close-up cross-section of the labyrinth seal area of FIG. 2, showing a sleeve containing replacement fins installed to replace a damaged fin section that has been removed by machining.
Figure 4:
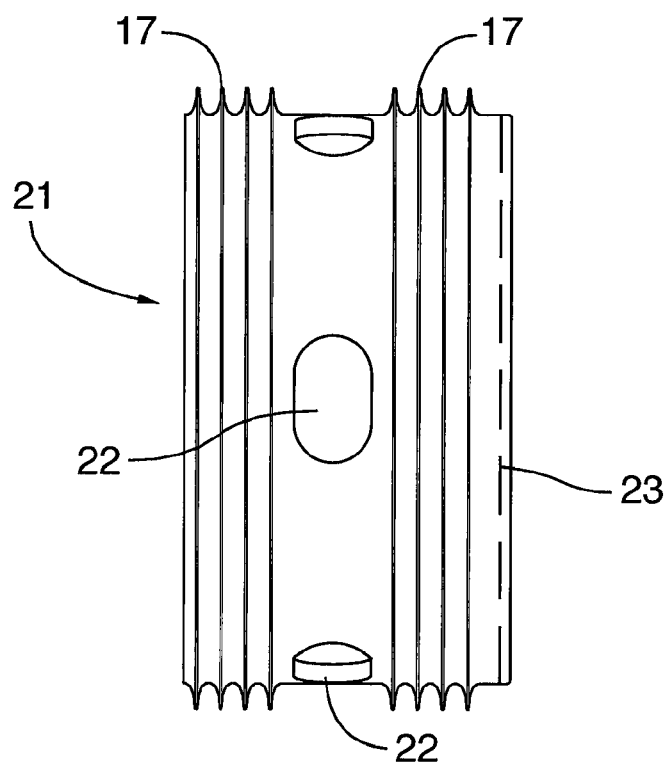
FIG. 4 is a side view of a complete sleeve containing replacement fins as shown installed in FIG. 3, in accordance with one embodiment of the invention.

In FIG. 3 the shaft 12 was originally manufactured with eight fins 17 on the shaft 12 that have been replaced with a fin-bearing sleeve 21 as shown in FIG. 4 in greater detail. Repair of the damaged ones of the eight fins 17 is carried out by first removing a section from the inner shaft 12 containing only the individual damaged ones of the eight fins 17, to form a recess 20 or alternatively removing all eight fins 17 to replace with a sleeve 21 as illustrated. To facilitate the step of machining or removing damaged fins 17, it may be preferred to simply remove all eight fins 17 to form a recess 20. Preferably, the removed section forms a recess 20 that is relatively shallow to minimize material removed from the shaft 12 to avoid weakening the inner shaft 12. This may be done by machining or grinding off the section to avoid heat damage which may be caused by other removal methods. The removed section of the shaft 12 may contain only the damaged fins 17, other undamaged fins 17, or all eight fins 17 on the labyrinth seal 16 as illustrated, depending on the needs of the application.

Shown in FIG. 4 is a sleeve 21 containing all eight replacement fins 17. Preferably, the replacement fins 17, are equal in number and arrangement to the removed fins 17, i.e.: eight fins 17 as illustrated. The sleeve 21 is designed to form a tight interference fit between the interior circumference of the sleeve 21 and the exterior circumference of the recess 20 formed by removing the section as described above. Because the replacement fins 22 are already machined on the prefabricated sleeve 21 before installation on the shaft 12, the problems associated with repairing the entire shaft 12, such as limited access space and need for precise dimensions are overcome.

The sleeve 21 is then fitted into the inner shaft 12 by interference fitting techniques known in the art. One preferred method of interference fitting is to heat the sleeve 21 to achieve an expansion of the sleeve diameter, and to cool down the inner shaft 12 to achieve a shrinkage of the shaft diameter. The expanded sleeve 21 is fitted over the shrunken inner shaft 12 and both are allowed to return to room temperature. This causes the sleeve 21 and the inner shaft 12 to engage each other in a tight fit when at the same temperature. Other interference fitting techniques are possible, such as press fitting with a hydraulic ram or clamping. As shown in FIG. 3, the sleeve 21 may have a radial flange 23 to limit the axial motion of the sleeve 21 relative to the recess 20 and ensure a positive axial engagement. As a result, the sleeve 21 is held in place by friction and interference, and no welding or metallurgical bonding is required.

The use of an interference fit instead of an interlocking fit between the inner shaft 12 and the sleeve 21 allows for simpler machining operations. This is not only quicker and less expensive, but also reduces possible wear to the parts. Additionally, the removed section can be shallow so that the strength of the inner shaft 12 is not significantly reduced.

Although the above description relates to a specific preferred embodiment as presently contemplated by the inventor, it will be understood that the invention in its broad aspect includes mechanical and functional equivalents of the elements described herein.

I claim:

1. A method for replacing a fin in a labyrinth seal, the fin having a radially outward runner contact surface and a radially inward base extending from a shaft, the method comprising the steps of:
   removing a section of the labyrinth seal containing the fin, thus forming a recess in a radially outward surface of the shaft;
   providing a sleeve with a radially inward surface and a replacement fin; and
   fitting the radially inward surface of the sleeve into the recess in the radially outward surface of the shaft, the sleeve being attached to the shaft by way of an interference fit with the shaft.

2. The method of claim 1 wherein the step of removing the section comprises machining.

3. The method of claim 1 wherein the step of fitting the sleeve does not involve application of heat and does not involve metallurgical bonding.

4. The method of claim 1 wherein the step of removing the section comprises removing a plurality of fins, and the sleeve comprises a plurality of replacement fins equal in number to the removed fins.

5. The method of claim 1 wherein the step of fitting the sleeve comprises heating the sleeve and cooling the shaft.

6. The method of claim 1 wherein the labyrinth seal is in a gas turbine engine.

* * * * *